United States Patent [19]

Kolczynski

[11] Patent Number: 5,361,097
[45] Date of Patent: Nov. 1, 1994

[54] PRIORITY PROCESSING OF ENCODED VIDEO SIGNAL INCLUDING INSERTION OF DATASTREAM NULL WORDS DURING PRIORITY ANALYSIS INTERVALS

[75] Inventor: Ronald J. Kolczynski, Hamilton, N.J.

[73] Assignee: RCA Thomson Licensing Corporation, Princeton, N.J.

[21] Appl. No.: 42,173

[22] Filed: Apr. 2, 1993

[51] Int. Cl.[5] .............................................. H04N 7/12
[52] U.S. Cl. ...................................... 348/390; 348/397; 348/437
[58] Field of Search ............... 358/141, 133, 135, 142; 348/388, 397, 398, 437, 390, 426; H04N 7/12

[56] References Cited

U.S. PATENT DOCUMENTS 5,231,486  7/1993  Acampora et al. ................. 358/133
5,241,383  8/1993  Chen et al. ......................... 358/136
5,243,419  9/1993  Faryar et al. ....................... 358/133

Primary Examiner—Victor R. Kostak
Assistant Examiner—Nathan I. Flynn
Attorney, Agent, or Firm—Joseph S. Tripoli; Eric P. Herrmann; Ronald H. Kurdyla

[57] ABSTRACT

A system for processing a high definition television signal includes a codeword prioritizer responsive to a codeword datastream derived from an MPEG-like encoder. The prioritizer generates a flag to indicate a breakpoint between high priority and standard priority codewords within a given image data group. Null codewords are inserted into the codeword datastream during intervals when the prioritizer is analyzing codewords to determine where to establish the priority breakpoint. The null codewords are ignored by a following transport processor which packs codewords into cells.

4 Claims, 3 Drawing Sheets

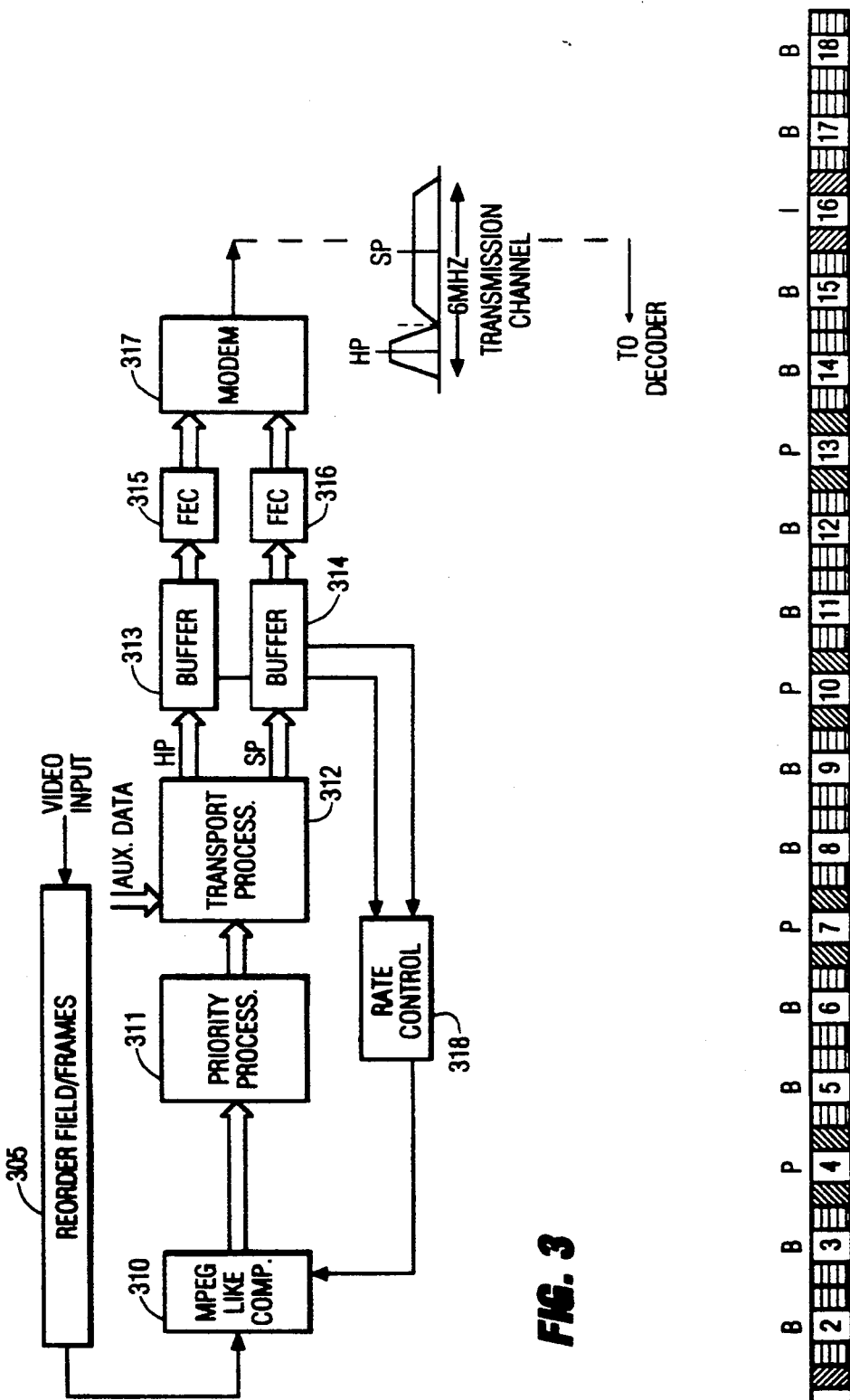
FIG. 3
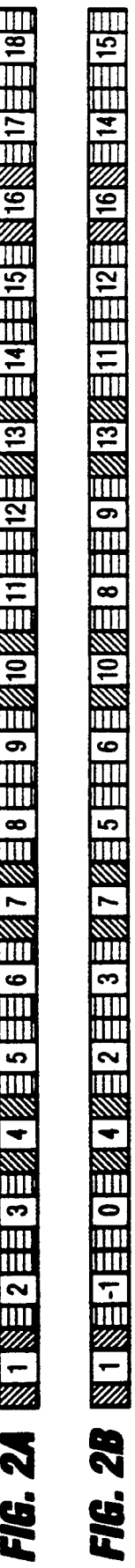
FIG. 2A
FIG. 2B

PRIORITY PROCESSING OF ENCODED VIDEO SIGNAL INCLUDING INSERTION OF DATASTREAM NULL WORDS DURING PRIORITY ANALYSIS INTERVALS

FIELD OF THE INVENTION

This invention concerns apparatus for processing a coded video signal. In particular, this invention concerns apparatus for prioritizing a video signal subjected to variable length coding (VLC) according to the MPEG standard.

Background of the Invention

U.S. Pat. No. 5,122,875-Raychaudhuri et al. describes a system for processing a high definition television (HDTV) signal subjected to MPEG-like variable length coding. MPEG is a standardized coding format being established by the International Organization for Standardization. The standard is described in the document "International Organization for Standardization," ISO/IEC DIS 11172, Coding for Moving Pictures and Associated Audio for Digital Storage Media, Rev. Nov. 23, 1991, which document is incorporated herein by reference for description of the general code format. The Raychaudhuri system includes a priority selector which separates codewords into high and low priority codeword sequences. The high and low priority codeword sequences correspond to compressed video data of relatively greater and lesser importance to image reproduction, respectively.

The priority selector analyzes codewords in order to calculate a breakpoint between high and low priority segments for a given image slice. As will be seen, a "slice" is an image segment corresponding to one of the layers of the MPEG coding syntax. The codeword datastream is then passed to a transport processor which packs the codeword data into transport cells each including header and payload sections, and which provides output HP and SP datastreams.

It is herein recognized as desirable for a priority selector unit in a data prioritizing system to exhibit synchronous operation so as to simplify timing requirements, e.g., by requiring only a single clock. In addition, it is herein recognized as desirable for the priority selector to process the codeword datastream without rendering the datastream incompatible with a standard data format, such as MPEG, when the prioritized data is received and packed by a transport processor prior to an output channel.

SUMMARY OF THE INVENTION

Apparatus according to the present invention is included in a codeword prioritizer which facilitates segmenting a codeword datastream into plural codeword sequences in accordance with a prescribed codeword relationship. In a disclosed preferred embodiment, a codeword prioritizer inserts null codewords into the codeword datastream during intervals when the prioritizer pauses to analyse a codeword sequence to determine where to establish a breakpoint between high priority (HP) and standard priority (SP) codewords. The null words are ignored by a following transport processor which packs codewords into cells, thereby maintaining compatibility with the MPEG format.

BRIEF DESCRIPTION OF THE DRAWING

FIGS. 2A and 2B are pictorial sequences of image fields/frames of encoded video signals.

FIG. 3 is a block diagram of an HDTV encoding system including a codeword prioritizer containing apparatus according to the present invention.

DETAILED DESCRIPTION

Figure 1:
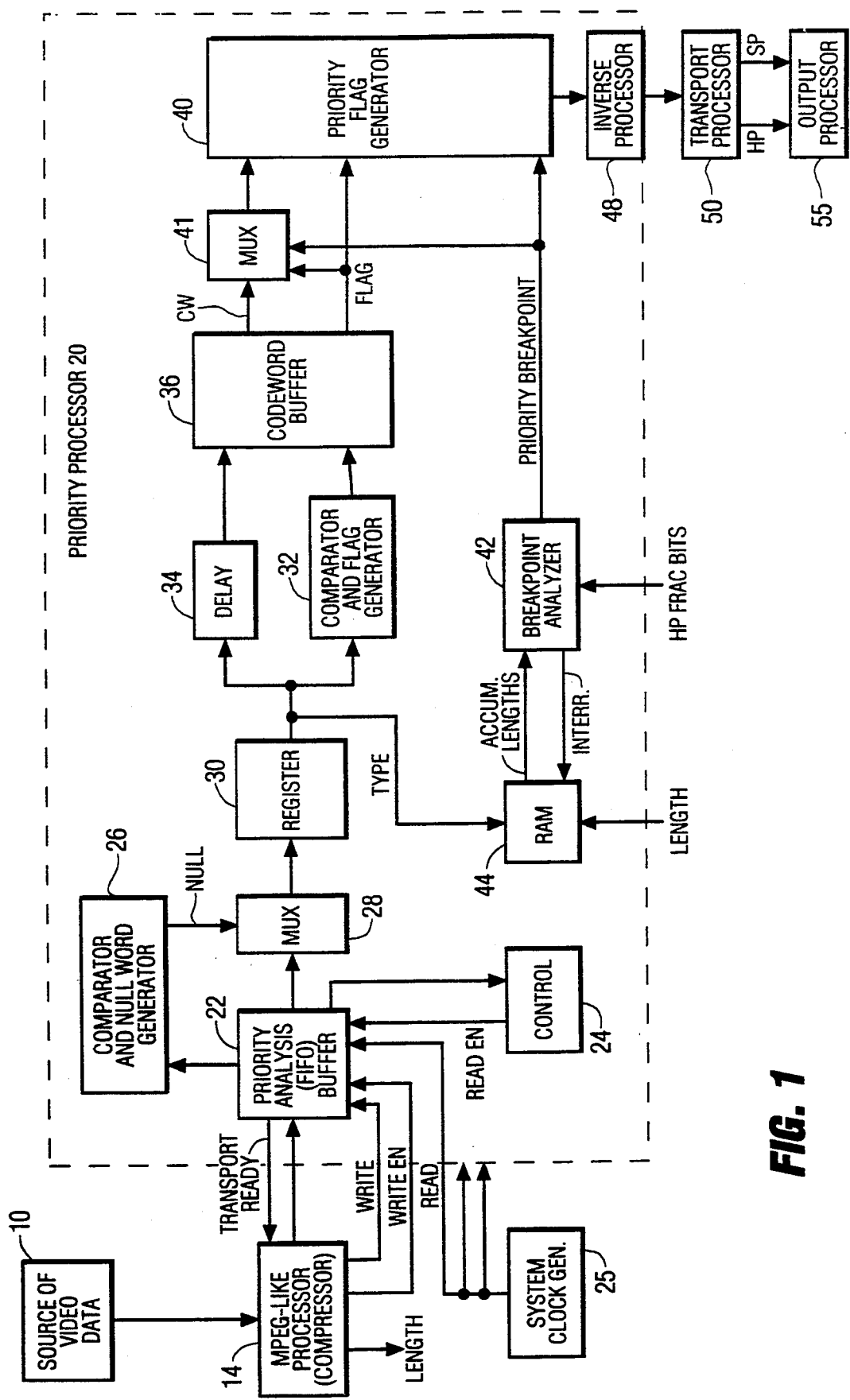
FIG. 1 shows a portion of a system for processing video data, such as high definition television data, including a priority processor containing apparatus according to the present invention.
Figure 5:
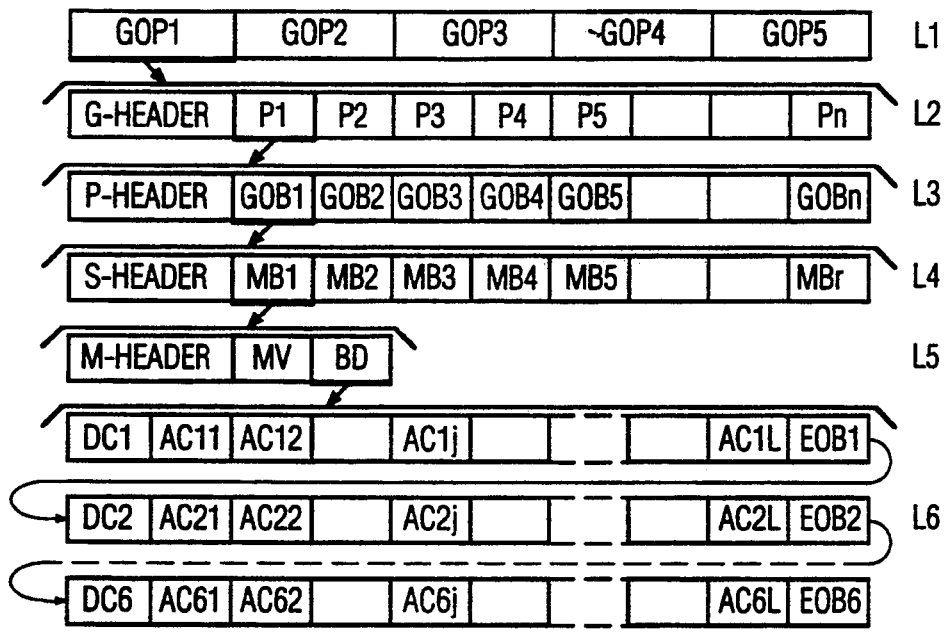
FIG. 5 is a generalized pictorial representation of the data format provided by the encoding compression apparatus in the system of FIG. 3.

In FIG. 1, digital video data from a high definition television source 10 is subjected to MPEG-like variable length coding (i.e., data compression) in a processor 14. Data source 10 reorders a sequence of original image field/frame data (as shown in FIG. 2A) so as to appear at an output as shown in FIG. 2B. The reordered sequence is applied to processor/compressor 14 which generates a compressed sequence of frames that are coded accordingly to an MPEG-like format. This format is hierarchical and is illustrated in abbreviated form in FIG. 5. The MPEG hierarchical format includes a plurality of layers each with respective header information. Nominally each header includes a start code, data related to the respective layer, and provision for adding header extensions. Much of the header information (as indicated in the referenced MPEG document) is required for synchronization purposes in an MPEG systems environment. Compressed video data, i.e., variable length coded (VLC) parallel codewords hierarchically formatted as indicated in FIG. 5, are coupled from processor 14 to a FIFO priority analysis buffer 22, which stores codewords immediately before being analyzed by an analysis circuit of a priority processor 20.

Processor 14 develops codewords containing codeword type data required by priority processor 20. Specifically, processor 14 employs a plurality of ROMs to transform each parallel input codeword into a parallel 22-bit equivalent format exhibiting a 7-bit type field and a 15-bit value field. The type field contains information which distinguishes codewords which have different meanings and different relative priorities, i.e., on the basis of type, within the MPEG hierarchy. The value field contains quantitative information for particular codeword types. All fifteen bits of the value field are not always used. For example, type "51" is a motion vector, and the 9-bit value associated with it indicates the magnitude of the vector. Processor 14 also provides a Length word concurrently with each codeword, indicating the length of that codeword, on separate busses in parallel-bit format. U.S. Pat. No. 5,122,875—Raychaudhuri discloses exemplary compressor apparatus which may be used for element 14 to provide MPEG-like hierarchically layered compressed video data.

The 22-bit codewords from processor 14 are provided non-synchronously to priority processor 20, together with a WRITE signal from processor 14 that tells buffer 22 when a (valid) new codeword is ready to be received. A write enable clock WRITE EN is provided for valid codewords to be written to buffer 22. A 23.6 MHz READ signal generated by system clock generator 25 is the single system clock used by all the elements of priority processor 20. A read enable signal READ EN is generated by control unit 24 when unit 24 detects that buffer 22 is receiving data from unit 14, and is inhibited at other times. Other characteristics of the READ EN signal will be discussed subsequently.

Figure 4:
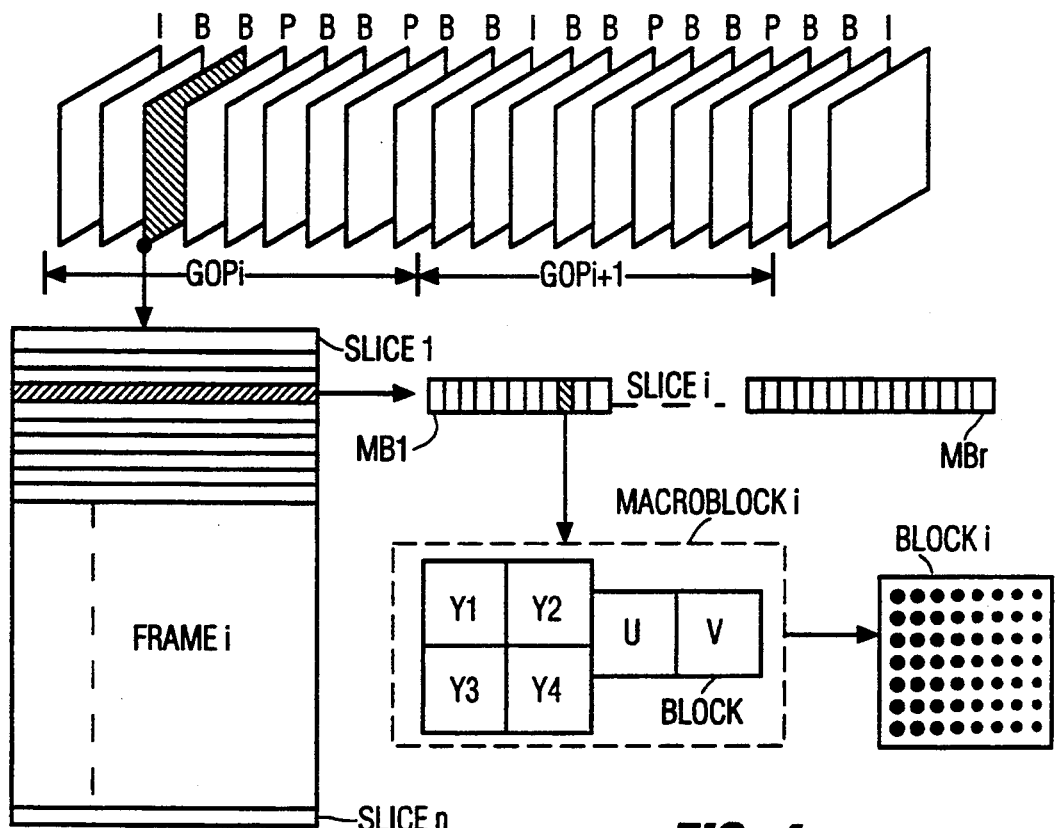
FIG. 4 is a pictorial representation of datablock generation developed by encoding/compression apparatus in the system of FIG. 3.

Priority processor 20 analyses the codeword datastream one slice at a time, and inserts null codewords (codewords with a designated length of zero) between slices during analysis intervals when the priority processor is calculating a breakpoint value which prioritizes each slice into HP and SP segments. Eventually these segments are packed into HP or SP cells by transport processor 50. A slice is an MPEG prescribed image segment which is shown in and will be described in connection with FIGS. 4 and 5. Associated with each codeword, including null codewords, is a parallel Length word which designates the bit length of the associated codeword. Null codewords are also inserted during intervals when no codewords are being generated by processor 14 (i.e., during image intervals containing little or no motion or image detail). The null codewords facilitate the synchronous operation of processor 20 and permit the use of a single system clock (READ). The null codewords are ignored by transport processor 50 during the data packing operation since the Length word associated with each null codeword is assigned a value of zero.

Buffer 22 may be of conventional design. For example, buffer 22 may include a pair of paralleled 8-bit wide buffers for receiving the 15-bit value codeword in respective portions, and an 8-bit wide buffer for receiving the 7-bit type codeword. Buffer type IDT 72241, produced by Integrated Device Technology is an 8-bit wide unit suitable for this purpose. Buffered outputs from these 8-bit units may be conveyed to value and type codeword outputs of buffer 22 via respective D flip-flops which are clocked by the READ signal and receive data at their "D" input from outputs of respective 8-bit buffers. The READ EN signal may be used to control a gate which permits or inhibits the flow of data from the 8-bit buffers to the output D flip-flops.

Codewords are read out from buffer 22 synchronously in response to the READ clock, one codeword at a time, but reading out stops between slices. Time multiplexer 28 inserts null codewords into the datastream from buffer 22 during intervals when buffer 22 is empty, and when buffer 22 is not reading out during analysis intervals when the priority breakpoint is being calculated for a given slice. A null codeword and associated (zero) length word are generated by a comparator and null codeword generator 26. The comparator portion of unit 26 monitors the output of buffer 22, and is programmed to sense the occurrence of a Picture Start codeword (which occurs immediately before each picture frame), and a Slice Start codeword (which occurs immediately before each image slice). The appearance of a Slice Start codeword, for example, indicates that a given slice (N) has been read out from buffer 22, and that the next slice (N+1) is about to be written into buffer 22. The analysis of slice data by a breakpoint analyzer 42 consumes a predetermined number of clock cycles, at the end of which buffer 22 is enabled to read out again in response to the READ EN signal, and null word generation stops. A null codeword and its associated parallel Length word are applied to one input of a time multiplexer 28, another input of which receives the type and value data output from buffer 22.

Register 30, clocked with the READ system clock, re-times the datastream to account for timing discrepancies that may occur due to the fact that multiplexer 28 is not a clocked device and may contribute a time delay. The synchronous codeword output of register 30 is applied to one input of a codeword buffer 36 via a comparator and flag generator 32, and to another input of codeword buffer 36 via a three-clock period delay network 34. The comparator portion of unit 32 is programmed to detect four codeword types for the purpose of generating four associated indicators, or flags, so that these codeword types are appropriately marked when received by transport processor 50. The four flags needed by the transport processor are a Group Start flag, a Picture Start flag, a Record Header flag and a Macroblock Address Increment flag. The flags are conveyed in parallel with the codeword stream.

Unit 32 generates the Group Start flag one codeword before the Picture Start codeword for an "I" frame (as will be seen and discussed in connection with FIGS. 4 and 5), and is therefore passed to codeword buffer 36 with a two-clock delay. The Group Start flag is coincident with a null codeword, one codeword before the Picture Start codeword. The Picture Start flag is generated coincident with the Picture Start codeword of every frame (I, P, B frames in FIG. 4). The Picture Start flag is generated by detecting the Picture Start codeword type, and passing the flag to codeword buffer 36 with a three clock period delay so as to be time aligned with the Picture Start codeword. The Record Header flag is generated at the beginning of every slice, one codeword before the Slice Start codeword, and is coincident with a null codeword which is later replaced by the priority breakpoint value by means of the operation of MUX 41. The Record Header codeword comprises a value indicating the priority breakpoint for the associated slice. The comparator in unit 32 detects the Slice Start type codeword, and outputs the Slice Start flag to buffer 36 with a two-clock delay. When the Record Header codeword emerges from codeword buffer 36 after a predetermined number of clock cycles, the priority breakpoint value for the current slice is available from analyzer 42 and is inserted into the value field of the null codeword which is coincident with the Record Header, by means of multiplexer 41. The FLAG output line of buffer 36 is applied to a control input of multiplexer 41 such that the priority breakpoint value is inserted into the value field of the null word coincident with the Record Header when the Record Header flag appears in the FLAG output line of buffer 36. The breakpoint value is inserted into the value field of the null word associated with the Record Header flag so that transport processor 50 has this value available when it forms the Record Header itself. The Macroblock Address Increment Indicator flag designates the beginning of a macroblock, and is generated coincident with the Macroblock Address Increment codeword when the Macroblock Address Increment codeword type is sensed.

Codeword buffer 36 is a fixed number of clock periods in length, 8192 clock periods in this example. As the codewords enter buffer 36 from delay 34, the flags produced by unit 32 are time aligned with their respective codewords and travel through buffer 36 with them. The long, fixed length delay exhibited by buffer 36 allows breakpoint analyzer 42 and associated circuits sufficient time to process the statistics of the codewords within a slice and produce a priority breakpoint value to prioritize the codewords when they emerge from buffer 36.

Properly time aligned codewords and flags from buffer 36 are conveyed in parallel to respective inputs of priority flag generator 40, which also receives the Priority Breakpoint value from breakpoint analyzer 42. The output codewords from unit 40 are inversely translated back to the codeword format at the input of processor 14 by means of unit 48, and are arranged into HP and SP cells, or transport packets, each having a header and a data (payload) section, by means of transport processor 50. HP and SP packets from transport processor 50 are processed by an output processor 55 before being transmitted over a data channel. As shown in FIG. 3 and in U.S. Pat. No. 5,122,875—Raychaudhuri et al., output processor 55 may include rate buffer, error correction and modem networks. The Raychaudhuri patent also describes networks which may be used for MPEG-like hierarchical encoding, codeword analysis for prioritizing purposes, and transport processing, as will be discussed subsequently.

To establish the slice priority breakpoint and consequently prioritized HP and SP bitstreams, the priority processing circuitry requires the data statistics for that slice, unaffected by changes that may be caused by new codewords entering the priority processor during the next slice interval. One architecture for addressing this problem involves the use of two priority analysis input buffers, operating in "ping-pong" fashion whereby codewords for a current slice are written into one buffer while codewords for a previous slice are read out from the other buffer. A dual buffer arrangement of this type is used in the system described in the previously mentioned Raychaudhuri patent. Although the dual buffer technique works adequately, it is expensive in terms of hardware since two buffers are required. In addition, the circuitry for generating timing control signals is complicated since the variable length coded slice codewords typically exhibit different lengths. The priority processor of FIG. 1 offers simpler, less expensive architecture using only one input buffer in the form of input buffer 22, and takes advantage of intervals when encoder 12 is not sending data.

The read enable signal READ EN provided to buffer 22 from control unit 24 facilitates the input buffer architecture comprising single buffer 22. As mentioned previously, the READ EN signal is absent when no codewords are read from buffer 22 and when buffer 22 is empty. At this time null codewords are inserted into the datastream via multiplexer 28 so that the codeword datastream remains synchronous. Buffer 22 begins reading out data when the READ EN signal appears at the end of the breakpoint analysis interval, and normally will continue to read out unless a break in the input codeword stream occurs (i.e., in response to an image with little or no detail) such that the codeword inventory in buffer 22 is depleted, in which case READ EN is inhibited and null codewords are inserted into the datastream via units 26 and 28. READ EN also is inhibited when control unit 24 senses (e.g., by means of comparators) a Picture Start codeword type or a Slice Start codeword type at the output of buffer 22. This condition indicates that the data that had been reading out from buffer 22 immediately before the buffer read operation stopped all belonged to a previous slice (N), and that a new slice (N+1) is about to begin.

Sensing of these codeword types occurs before the codeword itself is clocked out of buffer 22, and the codeword will remain in the output register of buffer 22 while READ EN is inhibited. This action is necessary because to detect the end of a slice it is necessary to observe the next Slice Start codeword or Picture Start codeword. Therefore the particular codeword that is detected will remain in buffer 22 until the next slice interval, even though it is used to detect the end of the current slice interval. While READ EN is disabled, the priority processor is in an analysis mode, and incoming codewords back up within buffer 22 until it reaches a predetermined capacity, at which time a Transport Ready control signal is inhibited, indicating to unit 14 that no more data can be accepted.

The determination of the slice priority breakpoint involves interaction between breakpoint analyzer 42 and dual-port Random Access Memory (RAM) 44, which operates over a slice interval and is cleared after each slice analysis interval. In a slice data accumulation mode, while input buffer 22 is reading out data, RAM 44 receives slice codeword type data at a first address port. Associated Length words, accumulated for all previous occurrences of that codeword type so far in the analysis interval, are sent to an accumulator via a first data port of RAM 44. A Length word is generated by processor 14 at the same time a variable length codeword is generated, indicating the bit length of the respectively associated codeword, and is sent to the other input node of the accumulator. The output of the accumulator contains an updated total of codeword bits for that particular codeword type at that point in the analysis interval, and is restored in RAM 44 by means of a second data port. During the data analysis mode, the sources for the RAM 44 data and addresses change. An incrementer output that counts from address 0, which represents the highest priority codeword type, to the highest codeword type value which represents the lowest priority codeword type, is sent to the first address port of RAM 44. The first data port will therefore be sending the accumulated bit lengths for each successively lower priority codeword type to one input node of the accumulator. The accumulator's other input is fed back from its own output so that the accumulator is effectively summing the total bit lengths of every codeword type in declining order of importance. At the point when the sum reaches the value of a signal HP FRAC BITS (discussed below), the codeword type whose bit length total caused the overall sum to reach HP FRAC BITS value is noted and will be used for the priority breakpoint of that analysis interval. The second address port of RAM 44 receives a delayed version of the incrementer count while the second data port is sending zero values to clear the locations and prepare the RAM for the accumulation mode of the next analysis interval.

Length values accumulated and stored by RAM 44 for the respective codeword types are conveyed to analyzer 42 via the second data port of RAM 44. A data interrogation signal INTERR is conveyed from analyzer 42 to the second address port of RAM 44. The interrogation signal causes RAM 44 to increment to the next memory address in the course of accumulating codeword type and length data, so that data from the next address is sent to unit 42 for analysis. Beginning with the highest address corresponding to highest priority data, RAM 44 accumulates codeword length values for each codeword type in declining order of importance until an address designated by an input signal HP FRAC BITS is reached, and outputs accumulated codeword length values to analyzer 42.

Analyzer 42 determines the priority breakpoint as a function of accumulated codeword length values and the value of input signal HP FRAC BITS. This signal indicates to breakpoint determining circuitry within unit 42 the target number of bits that are to be conveyed in the high priority channel for the slice being analyzed. Signal HP FRAC BITS is the product of the number of bits in the slice currently being analyzed, and an algorithmically determined parameter HP FRAC representing a percentage of high priority-to-total bit rate. HP FRAC basically is a data-split parameter dynamically computed over a frame interval as a function of bit allocation information and buffer occupancy information received from encoder rate buffers, for example. The number of bits of the slice being analyzed is computed by a microprocessor (not shown), and the parameter HP FRAC may be computed as described in U.S. Pat. No. 5,144,425—Joseph. The Joseph patent also describes apparatus including a breakpoint analyzer and accumulator responsive to length and type codewords, and to a value corresponding to the HP FRAC parameter.

While codewords of a slice N are being analyzed by unit 42 (at which time null words are inserted into the data stream), codewords of subsequent slices are being buffered within unit 22 as they are sent by unit 14. Since the READ EN signal is inhibited during the analysis interval, the amount of codewords stored by buffer 22 for the next slice continues to grow. This is not seen as a problem, however, because it has been observed that although unit 14 is capable of sending a considerable amount of data to buffer 22, data is often absent for relatively long periods of time such as when the image being processed possesses little or no detail or motion information. These idling periods are exploited, whereby buffer 22 is permitted to catch-up and ultimately empty via the read out process before the next burst of data is received from unit 14.

It is possible that buffer 22 may be full or almost full when unit 14 is ready to transmit the next burst of codewords to buffer 22. In this case a TRANSPORT READY signal from buffer 22 is inhibited, instructing an output buffer associated with unit 14 not to send data, whereby the output buffer of unit 14 continues to fill rather than reading out. This action provides a safety mechanism to provide data from being lost between unit 14 and priority processor 20. If the capacity of buffer 22 is large enough, the TRANSPORT READY signal will rarely be used.

In the system thus far described, non-synchronous input codewords are converted to a synchronous codeword datastream by means of null word insertion so that subsequent hardware can operate in response to a common clock. Hardware requirements are simplified since only a single input FIFO buffer, dual-port RAM and analyzer unit are required, while minimizing the number of times the datastream from the encoder must be stopped.

Priority flag generator 40 generates high priority and standard priority flags for respectively indicating the presence of high and standard priority codeword sequences as determined by the priority breakpoint. To this end flag generator 40 contains a comparator network responsive to the Priority Breakpoint value from analyzer 42. Unit 40 also receives a Record Header flag and other flags as previously discussed from buffer 36, and type and value codewords (CW) via buffer 36 and multiplexer 41. These codewords contain the Priority Breakpoint value in the Record Header null codeword value field of each slice, as inserted by Mux 41 in response to the appearance of the Record Header flag from codeword buffer 36. The Priority Breakpoint value in each slice Record Header facilitates decoding at a receiver by indicating where (i.e., at which codeword type in a slice) the HP/SP priority break will occur. Transport processor 50 uses the HP and SP flags generated by unit 40 to divide its input codeword datastream into output HP and SP datastreams. Codewords following an HP flag are routed to an output HP data path, and codewords following an SP flag are routed to an output SP data path. Parallel output data from unit 40 include the codewords from Mux 41 and the several flags from buffer 36, which are substantially unaltered by unit 40, and properly time-aligned HP and SP flags generated by unit 40.

Before being applied to transport processor 50, the output codeword datastream from unit 40 is processed by block 48, which provides the inverse of the codeword processing provided by unit 14. Unit 48 passes certain datastream components, such as flags, unaltered. Type and value code data are converted by respective ROMs in unit 48 into variable length codewords of up to 32 bits in length. Parallel data provided by priority processor 20 to transport processor 50 includes codewords, length words, flags including those generated by unit 32 and the HP, SP flags generated by unit 40. Transport processor 50 responds to the HP and SP flags for segmenting the codeword datastream from priority processor 20 into HP and SP streams of data packets containing payload and header sections, which are processed by an output processor 55 as will be seen in connection with FIG. 3. Additional information concerning the manner in which transport processor 50 develops prioritized output HP and SP datastreams is found in copending U.S. patent application Ser. No. 918,751 of A. A. Acampora filed Jul. 27, 1992.

FIG. 3 illustrates an exemplary HDTV encoding system employing apparatus according to the invention. FIG. 3 shows the system processing a single video input signal, but it is to be understood that the luminance and chrominance components are processed separately, and that luminance motion vectors are used for generating compressed chrominance components. The compressed luminance and chrominance components are interleaved to form macroblocks before codeword priority parsing.

A sequence of image fields/frames shown in FIG. 2A is applied to circuitry 305 which reorders the fields/frames according to FIG. 2B. The reordered sequence is applied to a compressor 310 which generates a compressed sequence of frames that are coded according to an MPEG-like format. This format is hierarchical and is illustrated in abbreviated form in FIG. 5. The MPEG hierarchical format includes a plurality of layers each with respective header information. Nominally each header includes a start code, data related to the respective layer and provision for adding header extensions.

When referring to the MPEG-like signal produced by the system, what is meant is that (a) successive picture fields/frames of video signals are encoded according to an I, P, B coding sequence, and (b) coded data at the picture level is encoded in MPEG-like slices or group of blocks, where the number of slices per field/frame may differ and the number of macro blocks per slice may differ. An I coded frame is one which is intraframe compressed such that only I frame compressed data is required to reproduce an image. P coded frames are coded according to a forward motion compensated predictive method, where the P frame coded data is generated from the current frame and an I or P frame occurring before the current frame. B coded frames are coded according to a bidirectionally motion compensated predictive method. The B coded frame data is generated from the current frame and from I and P frames occurring both before and after the current frame.

The coded output signal of the present system is segmented into groups of fields/frames, or groups of pictures (GOP) illustrated by the row of boxes L2 (FIG. 5). Each GOP (L2) includes a header followed by segments of picture data. The GOP header includes data related to the horizontal and vertical picture size, the aspect ratio, the field/frame rate, the bit rate, etc.

The picture data (L3) corresponding to respective picture fields/frames includes a picture header followed by slice data (L4). The picture header includes a field/frame number and a picture code type. Each slice (L4) includes a slice header followed by a plurality of blocks of data MBi. The slice header includes a group number and a quantization parameter.

Each block MBi (L5) represents a macroblock and includes a header followed by motion vectors and coded coefficients. The MBi headers include a macroblock address, a macroblock type and a quantization parameter. The coded coefficients are illustrated in layer L6. Each macroblock includes 6 blocks, including four luminance blocks, one U chrominance block and one V chrominance block. See FIG. 4. A block represents a matrix of pixels, e.g., $8 \times 8$, over which a discrete cosine transform (DCT) is performed. The four luminance blocks are a $2 \times 2$ matrix of contiguous luminance blocks representing, e.g., a $16 \times 16$ pixel matrix. The chrominance (U and V) blocks represent the same total area as the four luminance blocks. That is, before compression the chrominance signal is subsampled by a factor of two horizontally and vertically relative to luminance. A slice of data corresponds to data representing a rectangular portion of an image corresponding to an area represented by a contiguous group of macroblocks. A frame may include a raster scan of 360 slices, 60 slices vertically by 6 slices horizontally.

The block coefficients are provided one block at a time by the DCT. The DC coefficient occurs first, followed by respective DCT AC coefficients in the order of their relative importance. An end-of-block code EOB is appended at the end of each successively occurring block of data.

Data from compressor 310 is processed by a prioritizer 311 before being provided to a transport processor 312 which segments the data into high priority (HP) and standard priority (SP) components. These components are coupled via rate buffers 313 and 314 to respective forward error coding units 315 and 316. A rate controller 318 cooperates with buffers 313, 314 to adjust the average data rate provided by compressor 310. Thereafter the signals are coupled to a transmission modem 317 where the HP and SP data quadrature amplitude modulate respective carriers within a standard 6 MHz NTSC television channel.

What is claimed is:

1. In a video signal processing system, apparatus for facilitating the segmentation of a codeword datastream into first and second prioritized codeword sequences, said apparatus comprising:

means for providing a video signal codeword datastream comprising a succession of data groups;

codeword processing means including analyzing means responsive to said codeword datastream and operative during an analysis interval for determining a priority breakpoint between codewords within a data group;

means for generating null codewords during said analysis intervals; and transport processor means for receiving an output codeword datastream from said codeword processor means, including said null codewords, for formatting said datastream into said first and second prioritized codeword sequences for transmission via first and second prioritized data channels.

2. Apparatus according to claim 1, wherein
   said codeword datastream provided by said providing means includes codewords compatible with the MPEG standard; and
   said transport processor means ignores said null words when formatting codewords into data cells for transmission.

3. Apparatus according to claim 1, wherein
   said video signal is a television signal containing image information constituted by a plurality of image frames each comprising a plurality of image slices; and
   said analysis interval encompasses an image slice interval.

4. Apparatus according to claim 1, and further including
   first translating means, included in said providing means, for providing a translated version of an MPEG-coded video signal to said codeword processing means; and
   second translating means with an input responsive to an output signal from said codeword processing means, and an output for providing an MPEG-coded video signal to said transport processor.

* * * * *